US012794647B2

(12) United States Patent
Jiang et al.

(10) Patent No.: US 12,794,647 B2
(45) Date of Patent: Nov. 10, 2026

(54) METHOD AND DEVICE USED FOR CHANNEL STATE INFORMAITON (CSI) REPORTING

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 510 days.

(21) Appl. No.: 18/111,601

(22) Filed: Feb. 20, 2023

(65) Prior Publication Data

US 2023/0198726 A1 Jun. 22, 2023

Related U.S. Application Data

(63) Continuation of application No. PCT/CN2022/124562, filed on Oct. 11, 2022.

(30) Foreign Application Priority Data

Oct. 11, 2021 (CN) .......................... 202111180095.6

(51) Int. Cl.
*H04L 5/00* (2006.01)

(52) U.S. Cl.
CPC .................................. *H04L 5/0057* (2013.01)

(58) Field of Classification Search
CPC ... H04L 5/0057; H04L 5/0048; H04B 7/0413; H04B 7/0456; H04B 7/06; H04W 4/40
See application file for complete search history.

(56) References Cited

U.S. PATENT DOCUMENTS 11,996,911 B2 5/2024 Zheng et al.
2012/0008588 A1 * 1/2012 Chung ................ H04B 7/0613 370/329

(Continued)

FOREIGN PATENT DOCUMENTS

CN 110011706 A 7/2019
CN 112291851 A 1/2021

(Continued)

OTHER PUBLICATIONS

Third Generation Partnership Project, “Technical Specification Group Radio Access Network; NR; Physical channels and modulation (Release 16),” 3GPP TS 38.211 V16.7.0 (Sep. 2021).

(Continued)

*Primary Examiner* — Ian N Moore
*Assistant Examiner* — Latresa A Mccallum
(74) *Attorney, Agent, or Firm* — Volpe Koenig

(57) ABSTRACT

The present application provides a method and device in a node for wireless communications. A communication node first receives a first reference signal in a first RE set, the first RE set comprises multiple REs, an RS sequence of the first reference signal is a first RS sequence; then transmits a first signal and a second reference signal, the first signal occupies a second RE set, the second RE set comprises multiple REs; the received first reference signal is used to generate the first signal, and each element in at least partial elements in the first RS sequence is mapped to a part of the first signal in at least one RE. The application optimizes the calculation and reporting functions of Channel State Information (CSI) to enable the sharing of computing power among multiple enders, thus optimizing the overall performance of channel feedback in Artificial Intelligence (AI) scenarios.

20 Claims, 6 Drawing Sheets

(56) References Cited

U.S. PATENT DOCUMENTS

| | | | | |
|---|---|---|---|---|
| 2012/0257553 | A1* | 10/2012 | Noh | H04L 5/0057 370/280 |
| 2016/0037550 | A1* | 2/2016 | Barabell | H04W 72/046 455/450 |
| 2016/0285605 | A1* | 9/2016 | Andersson | H04L 5/0048 |
| 2018/0198657 | A1* | 7/2018 | Aiba | H04L 5/0094 |
| 2019/0064913 | A1 | 2/2019 | O'Brien et al. | |
| 2019/0165903 | A1* | 5/2019 | Lee | H04L 5/0053 |
| 2020/0137780 | A1 | 4/2020 | Kim et al. | |
| 2020/0337015 | A1* | 10/2020 | Chuang | H04W 72/0446 |
| 2021/0211244 | A1* | 7/2021 | Wu | H04L 1/0009 |
| 2023/0055553 | A1* | 2/2023 | Jiang | H04L 5/0048 |
| 2023/0087401 | A1 | 3/2023 | Shin et al. | |
| 2023/0262452 | A1* | 8/2023 | Yao | H04W 8/22 370/328 |

FOREIGN PATENT DOCUMENTS

| | | | |
|---|---|---|---|
| CN | 113271193 | A | 8/2021 |
| WO | 2020145779 | A1 | 7/2020 |

OTHER PUBLICATIONS

Third Generation Partnership Project, "Technical Specification Group Radio Access Network; NR; Multiplexing and channel coding (Release 16)," 3GPP TS 38.212 V16.7.0 (Sep. 2021).

Third Generation Partnership Project, "Technical Specification Group Radio Access Network; NR; Physical layer procedures for data (Release 16)," 3GPP TS 38.214 V16.7.0 (Sep. 2021).

Third Generation Partnership Project, "Technical Specification Group Radio Access Network; NR; Radio Resource Control (RRC) protocol specification (Release 16)," 3GPP TS 38.331 V16.6.0 (Sep. 2021).

* cited by examiner

METHOD AND DEVICE USED FOR CHANNEL STATE INFORMAITON (CSI) REPORTING

CROSS REFERENCE TO RELATED APPLICATIONS

This application is the continuation of the international patent application No. PCT/CN2022/124562, filed on Oct. 11, 2022, which claims the priority benefit of Chinese Patent Application No. 202111180095.6, filed on Oct. 11, 2021, the full disclosure of which is incorporated herein by reference.

BACKGROUND

Technical Field

The present application relates to transmission methods and devices in wireless communication systems, and in particular to a transmission scheme and device related to measurement and reporting of Channel State information (CSI).

Related Art

In traditional Long-Term Evolution (LTE) and Long-Term Evolution Advance (LTE-A) systems, an ender reports Channel State information (CSI) to enable a base station to obtain the CSI, thereby optimizing the scheduling of the base station to the ender. In 5G system, CSI feedback mechanism is continued and enhanced. Considering that measurement and reporting of the CSI become more complicated, the 5G system defines multiple priorities for CSI reportings. When multiple different CSI reportings are triggered at the same time and the processing power of the ender is exceeded, the ender can drop reportings of some types of CSIs according to priority level.

SUMMARY

The application of new technologies such as Artificial Intelligence (AI) in the communication field has attracted increasing attention, and inventors have found through researches that compared to the traditional technologies, new technologies require more computing consumption from the ender and reporting of corresponding channel information. Considering that in the AI scenario, the base station's access to CSI does not necessarily require very real-time feedback, but rather long-time statistical information feedback. Combined with the discussion of the existing Internet of Vehicles (IoV) technology in 5G, some new methods of CSI calculation and feedback need to be considered to improve the overall performance of the system.

To address the above problem, the present application provides a solution. For the above problem, although the present application adopts an AI scenario as an example, the present application is also applicable to, for example, a traditional scenario based on linear channel reconstruction, where similar technical effects can be achieved. Besides, the adoption of a unified solution for various scenarios contributes to the reduction of hardware complexity and costs. This application is also applicable to other scenarios facing similar problems, such as self-organizing networks, or a scenario where a central node is a non-base station node, or a high-speed moving scenario, or for different application scenarios, such as Enhanced Mobile Broadband (eMBB) and Ultra-reliable and Low Latency Communications (URLLC), where similar technical effects can be achieved. Additionally, the adoption of a unified solution for various scenarios, including but not limited to scenarios of eMBB and URLLC, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in Technical Specification (TS) 36 series, TS38 series and TS37 series of 3GPP specifications.

The present application provides a method in a first node for wireless communications, comprising:

receiving a first reference signal in a first Resource Element (RE) set, the first RE set comprising multiple REs, a Reference Signal (RS) sequence of the first reference signal is a first RS sequence; and transmitting a first signal and a second reference signal, the first signal occupying a second RE set, the second RE set comprising multiple REs;

herein, the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, one technical feature of the above method is in: the first node forwards the first reference signal from a base station to the second node in the present application through the first signal; further, the second node acquires superimposed channel information from the base station to the first node and channel information from the first node to the second node at the same time; then the second node estimates channel information from the first node to the second node carried by the received first signal through the second reference signal, and removes it from the first signal to obtain the channel information from the base station to the first node; so as to serve the function of the second node helping the first node perform CSI measurement and CSI reporting.

In one embodiment, another technical feature of the above method is in: in future AI system, the demand for CSI computing resources will become higher, when CSI computing and reporting resources of the first node itself in the present application are fully occupied, the scheme proposed in the present application enables that the second node helps the first node calculate and report channel information between the base station and the first node, thus realizing the sharing of computing power among multiple enders to improve the overall performance of the system.

According to one aspect of the present application, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

In one embodiment, one technical feature of the above method is in: the first signal does not need to comprise all elements in the first reference signal, and the first node only forwards partial reference signals in the first reference signal to save resources and improve spectral efficiency.

According to one aspect of the present application, each element of the at least partial elements in the first RS sequence is mapped to multiple REs in the first RE set, and each element of the at least partial elements in the first RS sequence is only mapped to one RE in the second RE set.

In one embodiment, one technical feature of the above method is in: the first RS sequence is mapped into the first RE set for a transmission by means of spread spectrum, and when the first reference signal is used to generate the first signal, signals on multiple REs occupied by the first reference signal that can be received are superimposed and mapped onto one RE occupied by the first signal, thereby reducing the overhead of the non-data channel to improve spectral efficiency.

According to one aspect of the present application, the at least partial elements in the first RS sequence are mapped into the second RE set in order according to a first criterion; the first criterion comprises frequency domain first and then time domain, or, the first criterion comprises time domain first and then frequency domain.

According to one aspect of the present application, comprising:

receiving a first signaling;

herein, the first signaling is used to indicate the first RE set.

In one embodiment, one technical feature of the above method is in: a base station configures resources used to transmit the first reference signal.

According to one aspect of the present application, comprising:

receiving first CSI;

herein, the first signal is used to generate the first CSI.

In one embodiment, one technical feature of the above method is in: the first signal carries channel quality of a radio signal between a base station and the first node as well as channel quality of a radio signal between the first node and the second node at the same time, so that the first signal can also be used to generate channel quality of a radio signal between the first node and the second node, that is, the first CSI.

According to one aspect of the present application, comprising:

receiving a first information block; and transmitting a second information block;

herein, a receiver of the first signal comprises a second node, and the second node transmits the first information block; the first information block is used to determine the first RE set; the second information block is used to indicate the first RE set; a transmitter of the first reference signal receives the second information block.

In one embodiment, one technical feature of the above method is in: the first information block is used to indicate how much computing power remains at the second node, so as to determine how many resources the system can allocate for transmitting the first reference signal, thus enabling the second node to help the first node estimate CSI.

In one embodiment, another technical feature of the above method is in: the second information block is used to forward that how much computing power remains at the second node.

According to one aspect of the present application, comprising:

transmitting a third information block;

herein, the third information block is used to indicate that computing power of the first node is fully occupied.

In one embodiment, one technical feature of the above method is in: only when the first node reports the third information block to confirm that computing power of the first node is fully occupied, the system will configure the first RE set to realize the above functions proposed in the present application.

The present application provides a method in a second node for wireless communications, comprising:

receiving a first signal and a second reference signal, the first signal occupying a second RE set, the second RE set comprising multiple REs;

herein, a transmitter of the first signal comprises a first node, the first node receives a first reference signal in a first RE set, the first RE set comprises multiple REs, and an RS sequence of the first reference signal is a first RS sequence; the first reference signal received by the first node is used to generate the first signal, and each element in at least partial elements in the first RS sequence is mapped to a part of the first signal in at least one RE; small-scale fading experienced by the second reference signal is used to determine small-scale fading experienced by the first signal.

According to one aspect of the present application, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

According to one aspect of the present application, each element of the at least partial elements in the first RS sequence is mapped to multiple REs in the first RE set, and each element of the at least partial elements in the first RS sequence is only mapped to one RE in the second RE set.

According to one aspect of the present application, the at least partial elements in the first RS sequence are mapped into the second RE set in order according to a first criterion; the first criterion comprises frequency domain first and then time domain, or, the first criterion comprises time domain first and then frequency domain.

According to one aspect of the present application, comprising:

transmitting first CSI;

herein, the first signal is used to generate the first CSI.

According to one aspect of the present application, comprising:

transmitting a first information block;

herein, the first node receives the first information block; the first information block is used to determine the first RE set.

According to one aspect of the present application, comprising:

transmitting a fourth information block;

herein, the fourth information block is used to indicate that computing power of the second node is not fully occupied.

According to one aspect of the present application, comprising:

transmitting a second signal, the second signal comprising second CSI;

herein, the first signal and the second reference signal are used together to determine the second CSI, and the second CSI is for channel quality of a radio signal between a transmitter of the first reference signal and the first node.

The present application provides a method in a third node for wireless communications, comprising:

transmitting a first reference signal in a first RE set, the first RE set comprising multiple REs, an RS sequence of the first reference signal being a first RS sequence;

herein, a receiver of the first reference signal comprises a first node, the first node transmits a first signal and a second reference signal, the first signal occupies a second RE set, and the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

According to one aspect of the present application, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

According to one aspect of the present application, each element of the at least partial elements in the first RS sequence is mapped to multiple REs in the first RE set, and each element of the at least partial elements in the first RS sequence is only mapped to one RE in the second RE set.

According to one aspect of the present application, the at least partial elements in the first RS sequence are mapped into the second RE set in order according to a first criterion; the first criterion comprises frequency domain first and then time domain, or, the first criterion comprises time domain first and then frequency domain.

According to one aspect of the present application, comprising:

transmitting a first signaling, the first signaling being used to indicate the first RE set.

According to one aspect of the present application, comprising:

receiving a second information block;

herein, a receiver of the first signal comprises a second node, and the second node transmits a first information block; the first information block is used to determine the first RE set; the second information block is used to indicate the first RE set; the first node transmits the second information block.

According to one aspect of the present application, comprising:

receiving a third information block;

herein, the third information block is used to indicate that computing power of the first node is fully occupied.

According to one aspect of the present application, comprising:

receiving a fourth information block;

herein, the fourth information block is used to indicate that computing power of a second node is not fully occupied, and the first signal and a receiver of the second reference signal comprise the second node.

According to one aspect of the present application, comprising:

receiving a second signal, the second signal comprising second CSI;

herein, the first signal and the second reference signal are used together to determine the second CSI, and the second CSI is for channel quality of a radio signal between the third node and the first node.

The present application provides a first node for wireless communications, comprising:

a first transceiver, receiving a first reference signal in a first RE set, the first RE set comprising multiple REs, an RS sequence of the first reference signal being a first RS sequence;

a second transceiver, transmitting a first signal and a second reference signal, the first signal occupying a second RE set, the second RE set comprising multiple REs;

herein, the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

The present application provides a second node for wireless communications, comprising:

a third transceiver, receiving a first signal and a second reference signal, the first signal occupying a second RE set, the second RE set comprising multiple REs;

herein, a transmitter of the first signal comprises a first node, the first node receives a first reference signal in a first RE set, the first RE set comprises multiple REs, and an RS sequence of the first reference signal is a first RS sequence; the first reference signal received by the first node is used to generate the first signal, and each element in at least partial elements in the first RS sequence is mapped to a part of the first signal in at least one RE; small-scale fading experienced by the second reference signal is used to determine small-scale fading experienced by the first signal.

The present application provides a second node for wireless communications, comprising:

a fourth transceiver, transmitting a first reference signal in a first RE set, the first RE set comprising multiple REs, an RS sequence of the first reference signal being a first RS sequence;

herein, a receiver of the first reference signal comprises a first node, the first node transmits a first signal and a second reference signal, the first signal occupies a second RE set, and the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the present application has the following advantages over conventional schemes:

in future AI system, the demand for CSI computing resources will become higher, when CSI computing and reporting resources of the first node itself in the present application are fully occupied, the scheme proposed in the present application enables the second node to help the first node calculate and report channel information between the base station and the first node, thus enabling the sharing of computing power among multiple enders to improve the overall performance of the system;

the first signal does not need to comprise all elements in the first reference signal, and the first node only forwards partial reference signals in the first reference signal to save resources and improve spectral efficiency;
- the first RS sequence is mapped into the first RE set for a transmission by means of spread spectrum, and when the first reference signal is used to generate the first signal, signals on multiple REs occupied by the first reference signal that can be received are superimposed and mapped onto one RE occupied by the first signal, thereby reducing the overhead of the non-data channel to improve spectral efficiency;
- the first information block is used to indicate how much computing power remains at the second node, so as to determine how many resources the system can allocate for transmitting the first reference signal, thus enabling the second node to help the first node estimate CSI.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
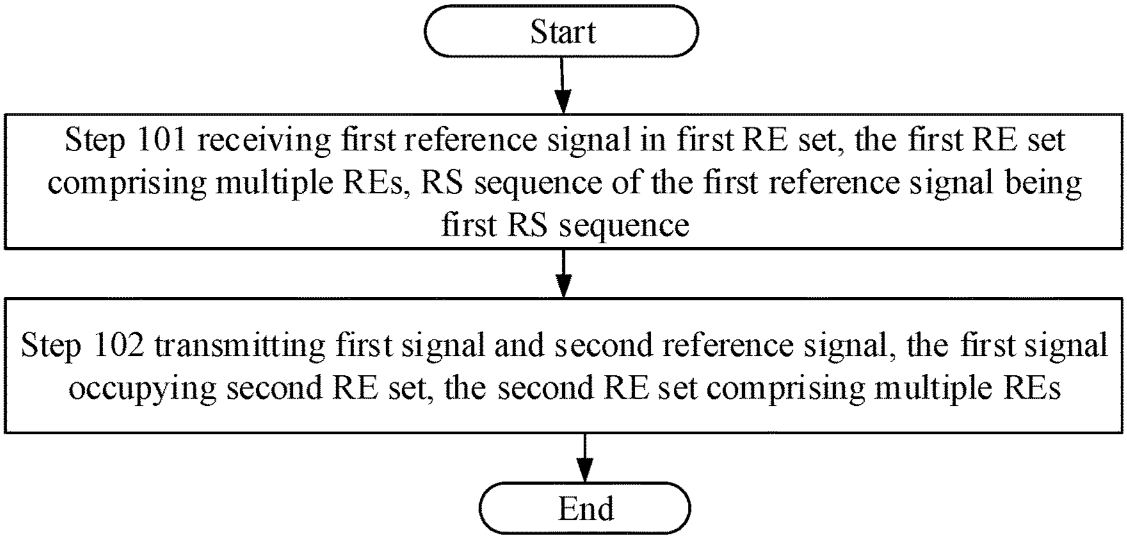
FIG. 1 illustrates a flowchart of the processing of a first node according to one embodiment of the present application.

Embodiment 1 illustrates a flowchart of processing of a first node, as shown in FIG. 1. In step 100 illustrated by FIG. 1, each box represents a step. In Embodiment 1, a first node in the present application receives a first reference signal in a first RE set in step 101, the first RE set comprises multiple REs, and an RS sequence of the first reference signal is a first RS sequence; transmits a first signal and a second reference signal in step 102, the first signal occupies a second RE set, and the second RE set comprises multiple REs.

In Embodiment 1, the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

Typically, the first node is an ender.

Typically, the first node is used to relay radio signals from other enders.

Typically, the first node is used to receive and forward radio signals from other enders.

In one embodiment, the first RE set occupies more than one RE.

In one embodiment, time-domain resources occupied by the first RE set are not greater than one slot.

In one embodiment, time-domain resources occupied by the first RE set comprise T1 slots, T1 being a positive integer greater than 1.

In one subembodiment of the embodiment, the T1 slots are continuous.

In one subembodiment of the embodiment, there at least exist two slots in the T1 slots being discontinuous.

In one embodiment, REs occupied by the first RE set comprise all or partial REs comprised in an IE NZP-CSI-RS-Resource in TS 38.331.

In one embodiment, REs occupied by the first RE set comprise all or partial REs comprised in an IE NZP-CSI-RS-ResourceSet in TS 38.331.

In one embodiment, REs occupied by the first RE set comprise all or partial REs comprised in an IE csi-SSB-ResourceList in TS 38.331.

In one embodiment, REs occupied by the first RE set comprise all or partial REs comprised in an IE CSI-SSB-ResourceSet in TS 38.331.

In one embodiment, the first reference signal comprises a Channel State Information-Reference Signal (CSI-RS).

In one embodiment, the first reference signal comprises a Synchronization Signal Block (SSB).

In one embodiment, the first reference signal comprises a synchronization signal.

In one embodiment, a physical-layer channel occupied by the first reference signal comprises a Physical Broadcast Channel (PBCH).

In one embodiment, the first reference signal comprises a Demodulation Reference Signal (DMRS).

In one embodiment, the first reference signal comprises a Phase Tracking Reference Signal (PT-RS).

In one embodiment, the first reference signal comprises a Positioning Reference Signal (PRS).

In one embodiment, a transmitter of the first reference signal is the third node in the present application.

In one embodiment, a part of any RE of the first reference signal is mapped by an element in the first RS sequence.

In one embodiment, REs occupied by the first reference signal comprise multiple RE groups, a part of any RE group in the multiple RE groups is mapped by an element in the first RS sequence, and one RE group comprises L1 REs, L1 being a positive integer greater than 1.

In one embodiment, L1 in the present application is 2.

In one embodiment, L1 in the present application is an even number.

In one embodiment, L1 in the present application is 4.

In one embodiment, L1 in the present application is a positive integral power of 2.

In one embodiment, the first RS sequence comprises a Pseudo-random Sequence.

In one embodiment, the first RS sequence comprises a Gold sequence with a length of 31.

In one embodiment, the first RS sequence comprises a m sequence with a length of 127.

In one embodiment, the first RS sequence comprises 3 m sequences with a length of 127.

In one embodiment, the first RS sequence comprises 336 m sequences with a length of 127.

In one embodiment, the first RS sequence comprises a sequence used to generate a DM-RS in TS 38.211.

In one embodiment, the first RS sequence comprises a sequence used to generate a CSI-RS in TS 38.211.

In one embodiment, the first RS sequence comprises a sequence used to generate a PT-RS in TS 38.211.

In one embodiment, the first RS sequence comprises a sequence used to generate a PRS in TS 38.211.

In one embodiment, the first RS sequence comprises a sequence used to generate a Primary Synchronization Signal (PSS) in TS 38.211.

In one embodiment, the first RS sequence comprises a sequence used to generate a Secondary Synchronization Signal (SSS) in TS 38.211.

In one embodiment, the first signal is transmitted on sidelink.

In one embodiment, the first signal comprises a Synchronization Signal Block (SSB) on sidelink.

In one embodiment, a physical-layer channel occupied by the first signal comprises a Physical Sidelink Broadcast Channel (PSBCH).

In one embodiment, a physical-layer channel occupied by the first signal comprises a Physical Sidelink Control Channel (PSCCH).

In one embodiment, a physical-layer channel occupied by the first signal comprises a Physical Sidelink Shared Channel (PSSCH).

In one embodiment, the second reference signal comprises a CSI-RS on sidelink.

In one embodiment, the second reference signal comprises a DM-RS on sidelink.

In one embodiment, the second reference signal comprises a PSS on sidelink.

In one embodiment, the second reference signal comprises an SSS on sidelink.

In one embodiment, the second RE set occupies more than one RE.

In one embodiment, time-domain resources occupied by the second RE set are not greater than one slot.

In one embodiment, time-domain resources occupied by the second RE set comprise T2 slots, T2 being a positive integer greater than 1.

Typically, a number of subcarrier(s) occupied by the first RE set is different from a number of subcarrier(s) occupied by the second RE set.

Typically, in a unit time length, a number of slot(s) occupied by the second RE set is less than a number of slot(s) occupied by the first RE set.

In one embodiment, the unit time length occupies T3 continuous slots, T3 being a positive integer greater than 1.

Typically, in a unit frequency bandwidth, a number of Resource Block(s) (RB(s)) occupied by the second RE set is less than a number of slot(s) occupied by the first RE set.

In one embodiment, the unit frequency bandwidth occupies F1 continuous RBs, F1 being a positive integer greater than 1.

In one embodiment, the first signal does not comprise data and does not comprise control information.

In one subembodiment of the embodiment, the control information comprises Uplink Control Information (UCI) and Sidelink Control Information (SCI).

In one subembodiment of the embodiment, the meaning of the first signal not comprising data comprises: any RE in the first signal is not generated by one or multiple bits in a Transport Block (TB).

In one embodiment, any RE occupied by the first signal is mapped by one element in the first RS sequence.

In one embodiment, an RE occupied by the first signal comprises multiple RE groups, any RE group in the multiple RE groups is mapped by one element in the first RS sequence, and one RE group comprises L2 REs, L1 being a positive integer greater than 1.

In one embodiment, a part of any RE of the first signal is mapped by an element in the first RS sequence.

In one embodiment, an RE occupied by the first signal comprises multiple RE groups, a part of any RE group in the multiple RE groups is mapped by an element in the first RS sequence, and one RE group comprises L2 REs, L1 being a positive integer greater than 1.

In one embodiment, L2 in the present application is 2.

In one embodiment, L2 in the present application is an even number.

In one embodiment, L2 in the present application is 4.

In one embodiment, L2 in the present application is a positive integral power of 2.

In one embodiment, L1 in the present application is equal to L2 in the present application.

In one embodiment, a receiver of the first reference signal comprises a second node in the present application.

In one subembodiment of the embodiment, the second node is an ender.

Typically, the first reference signal received by the first node carries first channel information, and the first channel information is for a radio channel between the first node and the third node in the present application.

In one embodiment, the first channel information only comprises small-scale fading.

In one embodiment, the first channel information comprises small-scale fading and large-scale fading.

In one embodiment, the first channel information comprises a channel matrix.

In one embodiment, the first channel information comprises a channel impulse response.

In one embodiment, the transmitted first reference signal does not carry the first channel information in the present application.

In one embodiment, the meaning of the above phrase of the received first reference signal being used to generate the first signal comprises: the received first reference signal is used to generate the first signal without channel estimation.

In one embodiment, the meaning of the above phrase of the received first reference signal being used to generate the first signal comprises: the received first reference signal is used to generate the first signal without demodulation.

In one embodiment, the meaning of the above phrase of the received first reference signal being used to generate the first signal comprises: the received first reference signal is used to generate the first signal after power adjustment.

In one subembodiment of the above embodiment, the power adjustment comprises: transmit power of the first signal is raised compared with a received power value of the first reference signal.

In one subembodiment of the above embodiment, the power adjustment comprises: transmit power of the first signal is reduced compared with a received power value of the first reference signal.

In one embodiment, the meaning of the above phrase of the received first reference signal being used to generate the first signal comprises: the received first reference signal is used to generate the first signal after de-CDM.

In one embodiment, the meaning of the above phrase of each element in at least partial elements in the first RS sequence being mapped into a part of the first signal in at least one RE comprises: all elements comprised in the first RS sequence are mapped into an RE occupied by the first signal.

In one embodiment, the meaning of the above phrase of each element in at least partial elements in the first RS sequence being mapped into a part of the first signal in at least one RE comprises: the first RS sequence comprises a first RS sequence part and a second RS sequence part, both the first RS sequence part and the second RS sequence part are used to generate the first reference signal, and all elements in only the first RS sequence part in the first RS sequence part and the second RS sequence part are mapped to an RE occupied by the first signal.

In one subembodiment of the embodiment, the first RS sequence part comprises K1 elements, the second RS sequence part comprises K2 elements, a ratio of K1 to K2 is fixed, or a ratio of K1 to K2 is indicated through a Radio Resource Control (RRC) signaling; both K1 and K2 are positive integers greater than 1.

In one embodiment, the meaning of the above phrase of each element in at least partial elements in the first RS sequence being mapped into a part of the first signal in at least one RE comprises: all elements comprised in the first RS sequence at least comprise K3 elements, K3 being a positive integer greater than 1, and each of the K3 elements is mapped onto one of all REs occupied by the first signal.

In one subembodiment of the embodiment, K3 is equal to L1 in the present application.

In one subembodiment of the embodiment, K3 is equal to L2 in the present application.

Embodiment 2

Figure 2:
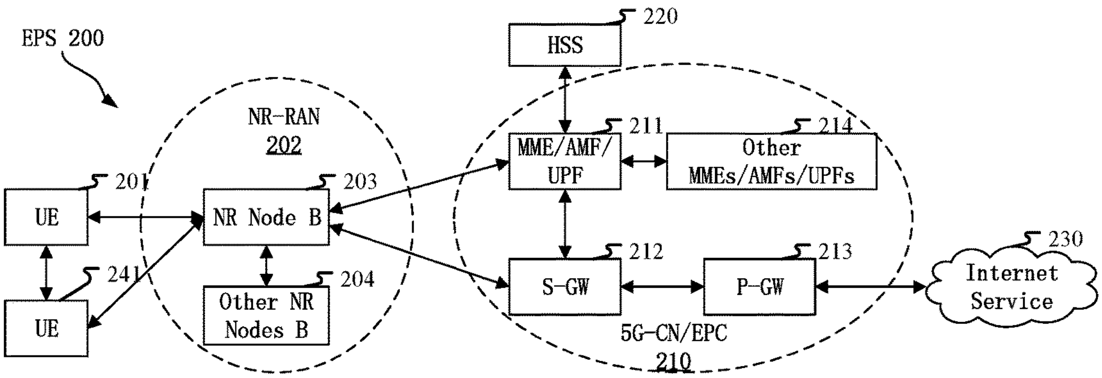
FIG. 2 illustrates a schematic diagram of a network architecture according to one embodiment of the present application.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise UE 201, an NR-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NR-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The GNB 203 provides an access point to the EPC/5G-CN 210 for the UE 201, and the gNB 203 provides an access point to the EPC/5G-CN 210 for the UE 241. Examples of the UE 201/UE 241 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an Sl/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 is a UE.

In one embodiment, the UE 201 is an ender.

In one embodiment, the UE 241 corresponds to the second node in the present application.

In one embodiment, the UE 241 is a UE.

In one embodiment, the UE 241 is an ender.

In one embodiment, the node 203 corresponds to the third node in the present application.

In one embodiment, the node 203 is a BaseStation (BS).

In one embodiment, the node 203 is a Base Transceiver Station (BTS).

In one embodiment, the node 203 is a NodeB (NB), or a gNB, or an eNB, or a ng-eNB, or an en-gNB, or a UE, or a relay, or a gateway, or at least one TRP.

In one embodiment, the node 203 comprises at least one TRP.

In one embodiment, the node 203 is a logical node.

In one embodiment, different structures in the node 203 are located in a same entity.

In one embodiment, different structures in the node 203 are located in different entities.

In one embodiment, the UE 201 supports at least one of the computation, compression or transmission of CSI using AI or deep learning.

In one embodiment, the UE 201 supports the calculation and feedback of CSI between the UE 201 and the base station through other enders.

In one embodiment, the UE 201 supports receiving a reference signal from the base station and forwarding the reference signal to other enders.

In one embodiment, the UE 201 is an ender supporting Massive-MIMO.

In one embodiment, the UE 241 supports at least one of the computation, compression or transmission of CSI using AI or deep learning.

In one embodiment, the UE 241 supports helping other enders calculate and feed back CSI between the other enders and the base station.

In one embodiment, the UE 241 supports receiving a reference signal from the terminal and calculating CSI of a cellular link carried by the reference signal and feeding it back to the base station.

In one embodiment, the UE 241 is a terminal supporting Massive-MIMO.

In one embodiment, the gNB 203 supports a transmission based on Massive-MIMO.

In one embodiment, the gNB 203 supports decoding CSI using AI or deep learning.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station supporting large delay differences.

In one embodiment, the gNB 203 is a flight platform.

In one embodiment, the gNB 203 is satellite.

Embodiment 3

Figure 3:
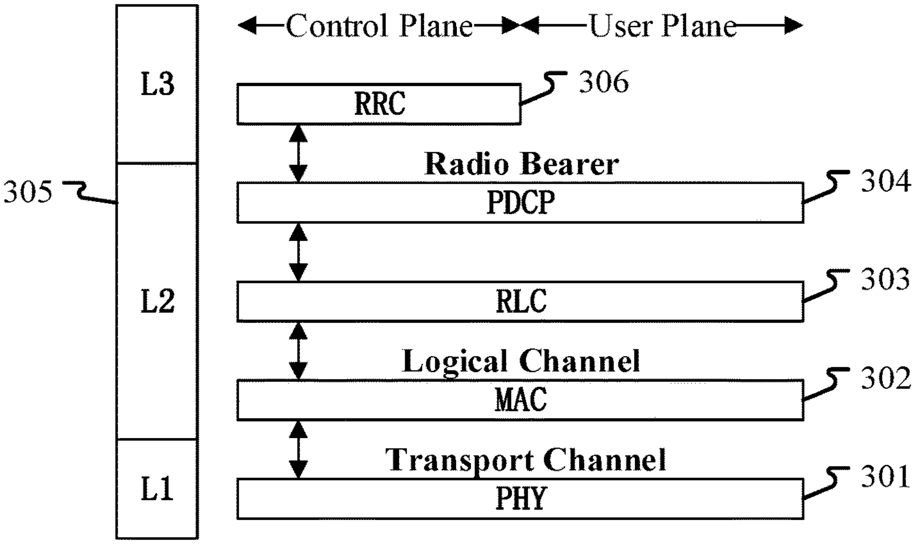
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the PDCP 304 of the second communication node is used to generate scheduling of the first communication node.

In one embodiment, the PDCP 354 of the second communication node is used to generate scheduling of the first communication node.

In one embodiment, the first reference signal in the present application is generated by the MAC 302 or the MAC 352.

In one embodiment, the first reference signal in the present application is generated by the PHY 301 or the PHY 351.

In one embodiment, the first signal in the present application is generated by the RRC 306.

In one embodiment, the first signal in the present application is generated by the MAC 302 or the MAC 352.

In one embodiment, the first signal in the present application is generated by the PHY 301 or the PHY 351.

In one embodiment, the second reference signal in the present application is generated by the MAC 302 or the MAC 352.

In one embodiment, the second reference signal in the present application is generated by the PHY 301 or the PHY 351.

In one embodiment, the first signaling in the present application is generated by the RRC 306.

In one embodiment, the first signaling in the present application is generated by the MAC 302 or the MAC 352.

In one embodiment, the first signaling in the present application is generated by the PHY 301 or the PHY 351.

In one embodiment, the first CSI in the present application is generated by the RRC 306.

In one embodiment, the first CSI in the present application is generated by the MAC 302 or the MAC 352.

In one embodiment, the first CSI in the present application is generated by the PHY 301 or the PHY 351.

In one embodiment, the first information block in the present application is generated by the RRC 306.

In one embodiment, the first information block in the present application is generated by the MAC 302 or the MAC 352.

In one embodiment, the first information block in the present application is generated by the PHY 301 or the PHY 351.

In one embodiment, the second information block in the present application is generated by the RRC 306.

In one embodiment, the second information block in the present application is generated by the MAC 302 or the MAC 352.

In one embodiment, the second information block in the present application is generated by the PHY 301 or the PHY 351.

In one embodiment, the third information block in the present application is generated by the RRC 306.

In one embodiment, the third information block in the present application is generated by the MAC 302 or the MAC 352.

In one embodiment, the third information block in the present application is generated by the PHY 301 or the PHY 351.

In one embodiment, the fourth information block in the present application is generated by the RRC 306.

In one embodiment, the fourth information block in the present application is generated by the MAC 302 or the MAC 352.

In one embodiment, the fourth information block in the present application is generated by the PHY 301 or the PHY 351.

In one embodiment, the second signal in the present application is generated by the RRC 306.

In one embodiment, the second signal in the present application is generated by the MAC 302 or the MAC 352.

In one embodiment, the second signal in the present application is generated by the PHY 301 or the PHY 351.

In one embodiment, the first node is an ender.

In one embodiment, the first node is a relay.

In one embodiment, the first node supports V2X transmission.

In one embodiment, the second node is an ender.

In one embodiment, the second node is a relay.

In one embodiment, the second node supports V2X transmission.

In one embodiment, the third node is a Transmitter Receiver Point (TRP).

In one embodiment, the third node is a cell.

In one embodiment, the third node is an eNB.

In one embodiment, the third node is a base station.

In one embodiment, the third node is used to manage multiple TRPs.

In one embodiment, the third node is a node for managing multiple cells.

In one embodiment, the third node is a node for managing multiple carriers.

Embodiment 4

Figure 4:
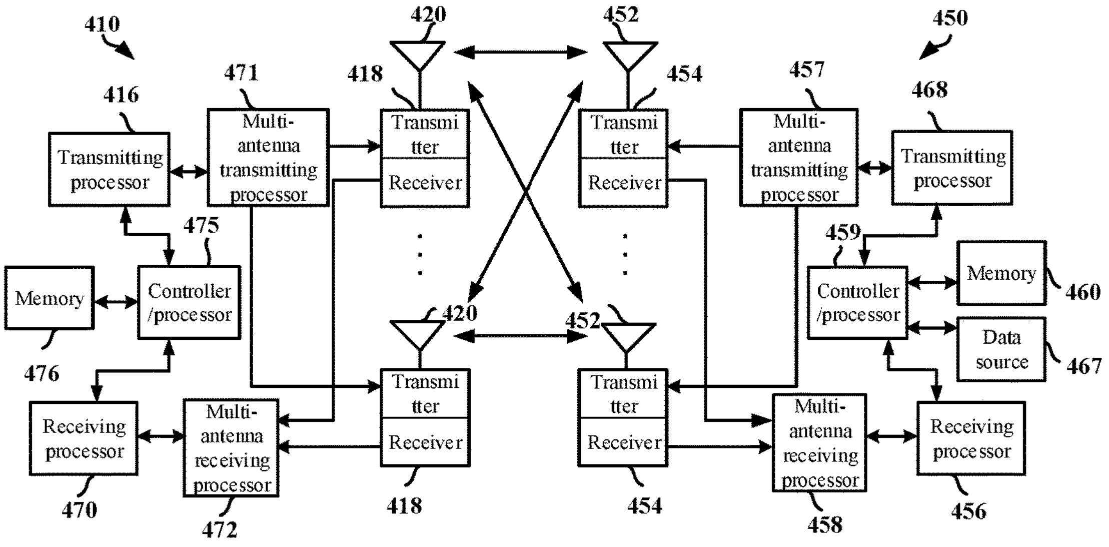
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams.

The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: first receives a first reference signal in a first RE set, the first RE set comprises multiple REs, an RS sequence of the first reference signal is a first RS sequence; then transmits a first signal and a second reference signal, the first signal occupies a second RE set, the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the first communication device 450 comprises at least one processor and at least one memory. a memory that stores a computer readable instruction program. The computer readable instruction program generates an action when executed by at least one processor. The action includes: first receiving a first reference signal in a first RE set, the first RE set comprising multiple REs, an RS sequence of the first reference signal being a first RS sequence; then transmitting a first signal and a second reference signal, the first signal occupying a second RE set, the second RE set comprising multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signal and a second reference signal, the first signal occupies a second RE set, the second RE set comprises multiple REs; a transmitter of the first signal comprises a first node, the first node receives a first reference signal in a first RE set, the first RE set comprises multiple REs, and an RS sequence of the first reference signal is a first RS sequence; the first reference signal received by the first node is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the first communication device 450 comprises at least one processor and at least one memory. a memory that stores a computer readable instruction program. The computer readable instruction program generates an action when executed by at least one processor. The action includes: receiving a first signal and a second reference signal, the first signal occupying a second RE set, the second RE set comprising multiple REs; a transmitter of the first signal comprises a first node, the first node receives a first reference signal in a first RE set, the first RE set comprises multiple REs, and an RS sequence of the first reference signal is a first RS sequence; the first reference signal received by the first node is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first reference signal in a first RE set, the first RE set comprises multiple REs, an RS sequence of the first reference signal is a first RS sequence; a receiver of the first reference signal comprises a first node, the first node transmits a first signal and a second reference signal, the first signal occupies a second RE set, and the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the second communication device 410 comprises a memory that stores a computer readable instruction program. The computer readable instruction program generates an action when executed by at least one processor. The action includes: transmitting a first reference signal in a first RE set, the first RE set comprising multiple REs, an RS sequence of the first reference signal being a first RS sequence; a receiver of the first reference signal comprises a first node, the first node transmits a first signal and a second reference signal, the first signal occupies a second RE set, and the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the first communication device 450 corresponds to a first node in the present application.

In one embodiment, the first communication device 450 corresponds to a second node in the present application.

In one embodiment, the second communication device 410 corresponds to a third node in the present application.

In one embodiment, the second communication device 410 corresponds to a second node in the present application.

In one embodiment, the first communication device 450 is a UE.

In one embodiment, the first communication device 450 is an ender.

In one embodiment, the first communication device 450 is an ender with relay function.

In one embodiment, the first communication device 450 is an ender supporting V2X transmission.

In one embodiment, the first communication device 450 can identify multiple TRPs under a base station.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, the second communication device 410 supports maintaining multiple TRPs.

In one embodiment, at least first four of the antenna 452, the receiver 454, the multi-antenna receiving processor 458, the receiving processor 456 and the controller/processor 459 are used to receive a first reference signal in a first RE set; at least first four of the antenna 420, the transmitter 418, the multi-antenna transmitting processor 471, the transmitting processor 416 and the controller/processor 475 are used to transmit a first reference signal in a first RE set.

In one embodiment, at least first four of the antenna 452, the transmitter 454, the multi-antenna transmitting processor 457, the transmitting processor 468, and the controller/processor 459 are used to transmit a first signal and a second reference signal.

In one embodiment, at least first four of the antenna 452, the receiver 454, the multi-antenna receiving processor 458, the receiving processor 456 and the controller/processor 459 are used to receive a first signal and a second reference signal.

In one embodiment, at least first four of the antenna 452, the receiver 454, the multi-antenna receiving processor 458, the receiving processor 456 and the controller/processor 459 are used to receive first signaling; at least first four of the antenna 420, the transmitter 418, the multi-antenna transmitting processor 471, the transmitting processor 416 and the controller/processor 475 are used to transmit a first signaling.

In one embodiment, at least first four of the antenna 452, the receiver 454, the multi-antenna receiving processor 458, the receiving processor 456 and the controller/processor 459 are used to receive first CSI.

In one embodiment, at least first four of the antenna 452, the transmitter 454, the multi-antenna transmitting processor 457, the transmitting processor 468, and the controller/processor 459 are used to transmit first CSI.

In one embodiment, at least first four of the antenna 452, the receiver 454, the multi-antenna receiving processor 458, the receiving processor 456 and the controller/processor 459 are used to receive a first information block.

In one embodiment, at least first four of the antenna 452, the transmitter 454, the multi-antenna transmitting processor 457, the transmitting processor 468, and the controller/processor 459 are used to transmit a first information block.

In one embodiment, at least first four of the antenna 452, the transmitter 454, the multi-antenna transmitting processor 457, the transmitting processor 468, and the controller/processor 459 are used to transmit a second information block; at least first four of the antenna 420, the receiver 418, the multi-antenna receiving processor 472, the receiving processor 470 and the controller/processor 475 are used to receive a second information block.

In one embodiment, at least first four of the antenna 452, the transmitter 454, the multi-antenna transmitting processor 457, the transmitting processor 468, and the controller/processor 459 are used to transmit a third information block; at least first four of the antenna 420, the receiver 418, the multi-antenna receiving processor 472, the receiving processor 470 and the controller/processor 475 are used to receive a third information block.

In one embodiment, at least first four of the antenna 452, the transmitter 454, the multi-antenna transmitting processor 457, the transmitting processor 468, and the controller/processor 459 are used to transmit a fourth information block; at least first four of the antenna 420, the receiver 418, the multi-antenna receiving processor 472, the receiving processor 470 and the controller/processor 475 are used to receive a fourth information block.

In one embodiment, at least first four of the antenna 452, the transmitter 454, the multi-antenna transmitting processor 457, the transmitting processor 468, and the controller/processor 459 are used to transmit a second signal; at least first four of the antenna 420, the receiver 418, the multi-antenna receiving processor 472, the receiving processor 470 and the controller/processor 475 are used to receive a second signal.

Embodiment 5

Figure 5:
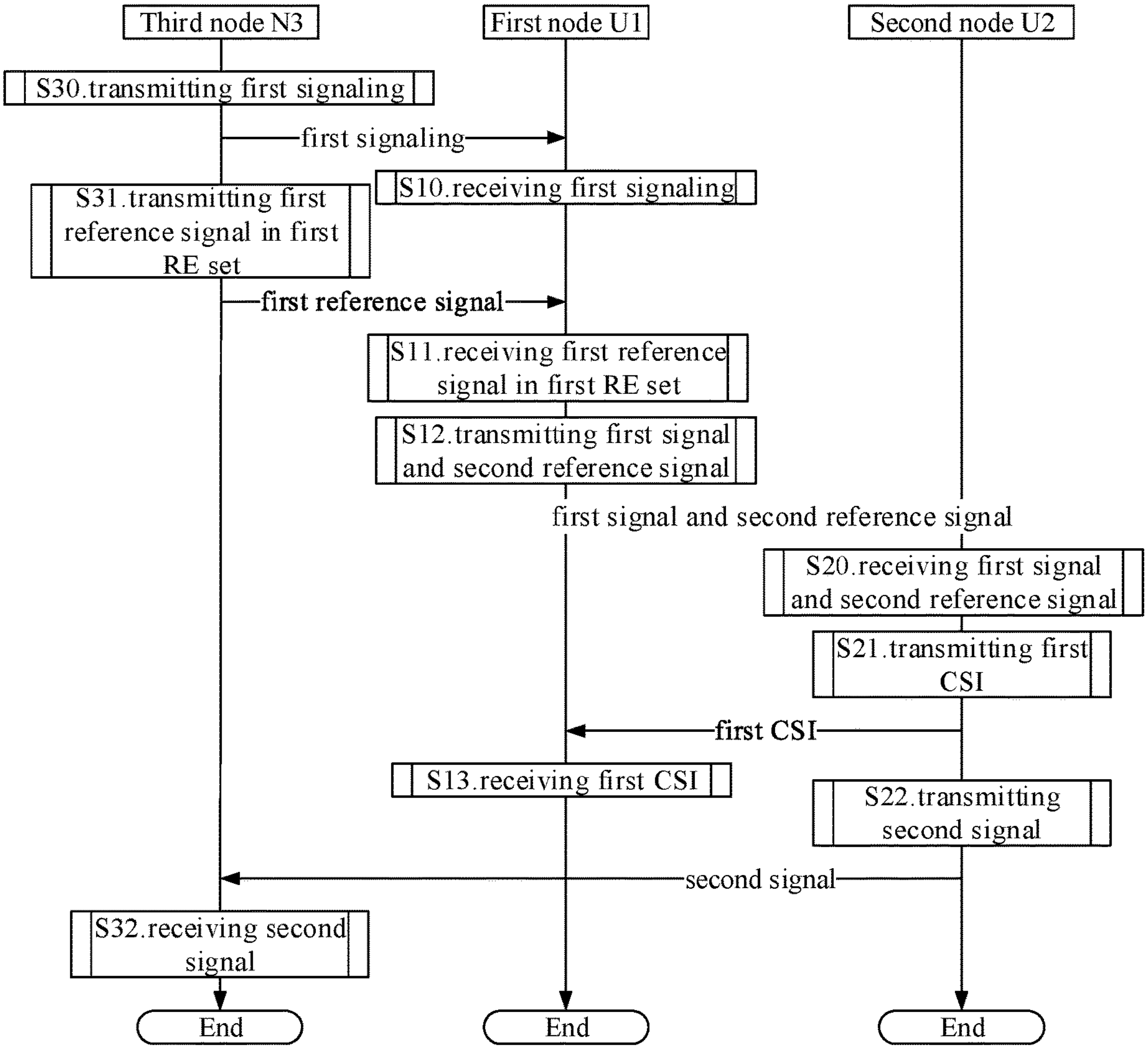
FIG. 5 illustrates a flowchart of a first reference signal according to one embodiment of the present application.

Embodiment 5 illustrates a flowchart of a first reference signal, as shown in FIG. 5. In FIG. 5, a first node U1 and a second node U2 are in communications via sidelink, the first node U1 and a third node N3 are in communications via cellular, and the second node U2 and the third node N3 are in communications via cellular. It is particularly underlined that the order illustrated in the embodiment does not put constraints over sequences of signal transmissions and implementations. Embodiments, sub-embodiments and subsidiary embodiments of embodiment 5 can be applied to embodiment 6 if no conflict is incurred, and vice versa, any of embodiments, sub-embodiments, and subsidiary embodiments of embodiment 6 can be applied to embodiment 5 if no conflict is incurred.

The first node U1 receives a first signaling in step S10; receives a first reference signal in a first RE set in step S11; transmits a first signal and a second reference signal in step S12; receives first CSI in step S13.

The second node U2 receives a first signal and a second reference signal in step S20; transmits a first CSI in step S21; transmits a second signal in step S22.

The third node N3 transmits a first signaling in step S30; transmits a first reference signal in a first RE set in step S31; receives a second signal in step S32.

In Embodiment 5, the first RE set comprises multiple REs, an RS sequence of the first reference signal is a first RS sequence; the first signal occupies a second RE set, the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal; the first signaling is used to indicate the first RE set; the first signal is used to generate the first CSI; the second signal comprises a second CSI; the first signal and the second reference signal are used together to determine the second CSI, the second CSI is for channel quality of a radio signal between the third node N3 and the first node U1.

In one embodiment, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

In one subembodiment of the embodiment, at least two of the Q1 RS resources occupy multiple same REs, and the at least two RS resources are distinguished by extension code.

In one subembodiment of the above embodiment, Q2 is 1.

In one subembodiment of the above embodiment, there exists one of the Q1 RS resources being NZP-CSI-RS-Resource in TS 38.331.

In one subembodiment of the above embodiment, there exists one of the Q1 RS resources being CSI-SSB-Resource in TS 38.331.

In one subembodiment of the above embodiment, the above phrase of the Q2 RS resource(s) being proper subset(s) of the Q1 RS resources comprises: Q1 is greater than Q2.

In one subembodiment of the above embodiment, the above phrase of the Q2 RS resource(s) being proper subset(s) of the Q1 RS resources comprises: any of the Q2 RS resource(s) is one of the Q1 RS resources, and there at least exists one of the Q1 RS resources not being any of the Q2 RS resource(s).

In one subembodiment of the above embodiment, the above phrase of the Q2 RS resource(s) being proper subset(s) of the Q1 RS resources comprises: any of the Q2 RS resource(s) is one of the Q1 RS resources, and the Q1 RS resources also comprise at least one RS resource other than the Q2 RS resource(s).

In one subembodiment of the above embodiment, the Q1 RS resources are respectively located in Q1 different slots.

In one subembodiment of the above embodiment, the Q1 RS resources are respectively located in Q1 different RBs.

In one embodiment, each element of the at least partial elements in the first RS sequence is mapped to multiple REs in the first RE set, and each element of the at least partial elements in the first RS sequence is only mapped to one RE in the second RE set.

In one embodiment, the at least partial elements in the first RS sequence are mapped into the second RE set in order according to a first criterion; the first criterion comprises frequency domain first and then time domain, or, the first criterion comprises time domain first and then frequency domain.

In one subembodiment of the embodiment, the first criterion comprises that each element is mapped to only one RE.

In one subembodiment of the above embodiment, the first criterion comprises that each element is mapped to L1 REs, L1 being a positive integer greater than 1.

In one subembodiment of the above embodiment, the second RE set comprising I multicarrier symbols in time domain and J subcarriers in time domain, and frequency domain first and then time domain refers to: an (m+n*J+1)-th element in the partial elements is mapped to an RE corresponding to an (m+1)-th subcarrier and an (n+1)-th multicarrier symbol in the second RE set, where I and J are positive integers greater than 1, m is a non-negative integer less than I, and n is a non-negative integer less than J.

In one subembodiment of the above embodiment, the second RE set comprising I multicarrier symbols in time domain and J subcarriers in time domain, and time domain first and then frequency domain refers to: an (m*I+n+1)-th element in the partial elements is mapped to an RE corresponding to an (m+1)-th subcarrier and an (n+1)-th multicarrier symbol in the second RE set, where I and J are positive integers greater than 1, m is a non-negative integer less than I, and n is a non-negative integer less than J.

In one embodiment, a number of subcarrier(s) occupied by the first RE set is different from a number of subcarrier(s) occupied by the second RE set.

In one embodiment, a number of multicarrier symbol(s) occupied by the first RE set is different from a number of multicarrier symbol(s) occupied by the second RE set.

In one embodiment, the multicarrier symbol in the present application is an Orthogonal Frequency Division Multiplexing (OFDM) symbol.

In one embodiment, the multicarrier symbol in the present application is a Single Carrier-Frequency Division Multiple Access (SC-FDMA) symbol.

In one embodiment, the multicarrier symbol in the present application is a Filter Bank Multi Carrier (FBMC) symbol.

In one embodiment, the multicarrier symbol in the present application is an PFDM symbol comprising a Cyclic Prefix (CP).

In one embodiment, the multicarrier symbol in the present application is a Discrete Fourier Transform Spreading Orthogonal Frequency Division Multiplexing (DFT-s-OFDM) symbol comprising a CP.

In one embodiment, the first signaling indicates the Q2 RS resource(s) in the present application.

In one embodiment, the first signaling is used to explicitly indicate the first RE set.

In one embodiment, the first signaling is used to implicitly indicate the first RE set.

In one embodiment, the first signaling comprises a first sub-signaling and a second sub-signaling, the first sub-signaling is used to indicate the first RE set, and the second sub-signaling is used to indicate the second RE set.

In one embodiment, the first signaling comprises the third sub-signaling, the third sub-signaling is used to indicate a first ender group, and the first ender group comprises the first node and the second node; the third sub-signaling is used to determine that enders in the first ender group can share computing power.

In one embodiment, a physical-layer channel occupied by the first signaling comprises a PDCCH.

In one embodiment, a physical-layer channel occupied by the first signaling comprises a PDSCH.

In one embodiment, the first signaling comprises an RRC signaling.

In one embodiment, the first signaling comprises a Medium Access Control (MAC) Control Element (CE).

In one embodiment, the first CSI is for channel quality of a radio signal between the first node U1 and the second node U2.

In one embodiment, the first signal is used by the second node U2 to generate the first CSI.

In one embodiment, the first CSI is used to indicate multi-user related information of the second node U2.

In one embodiment, the first CSI is used to indicate whether the first node U1 is applicable to perform multi-user transmission with the second node U2.

In one embodiment, the first CSI is used to determine a proportion of a number of RE(s) occupied by the first RE set and a number of RE(s) occupied by the second RE set.

In one embodiment, the first CSI is used to determine a number of RE(s) occupied by the second RE set.

In one embodiment, the meaning of the above phrase of the first signal and the second reference signal being used together to determine the second CSI comprises: the second node U2 determines channel information between the first node U1 and the second node U2 through the second reference signal, and then removes the channel information between the first node U1 and the second node U2 from the first signal to acquire channel information between the third node N3 and the first node U1, that is, the second CSI.

In one embodiment, a physical-layer channel occupied by the second signal comprises a Physical Uplink Control Channel (PUCCH).

In one embodiment, a physical-layer channel occupied by the second signal comprises a Physical Uplink Shared Channel (PUSCH).

In one embodiment, the second signal comprises UCI.

Embodiment 6

Figure 6:
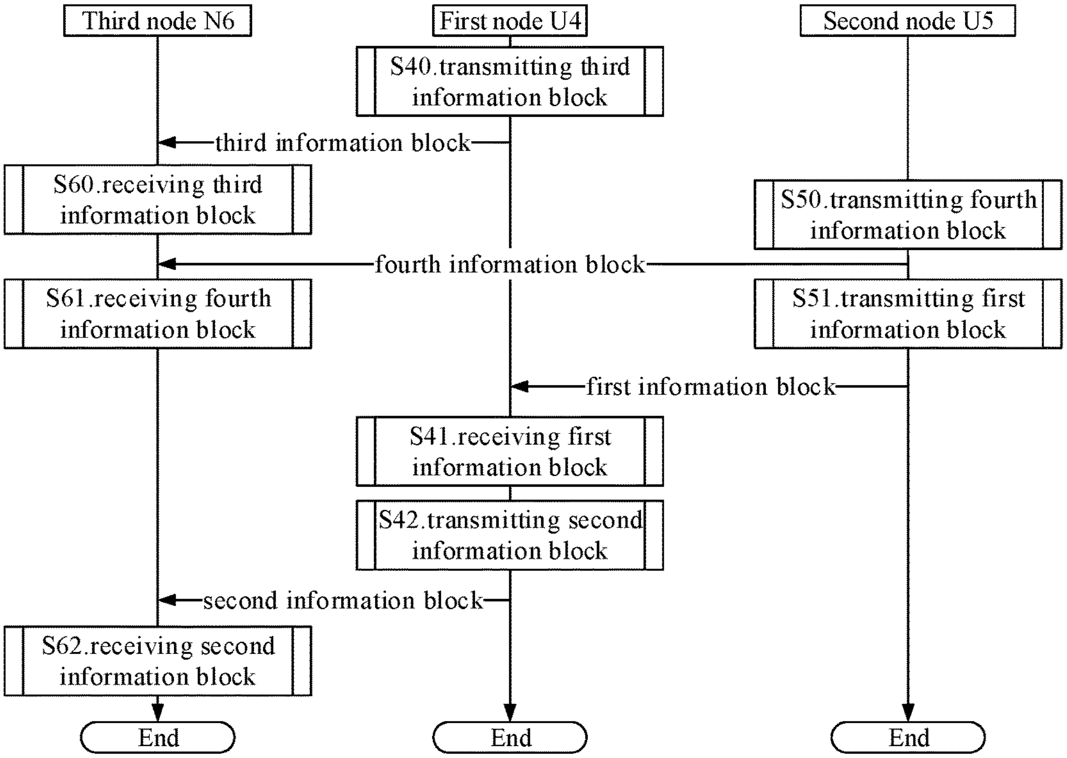
FIG. 6 illustrates a flowchart of a first information block and a second information block according to one embodiment of the present application.

Embodiment 6 illustrates a flowchart of a first information block and a second information block, as shown in FIG. 6. In FIG. 6, a first node U4 and a second node U5 are in communications via sidelink, a first node U4 and a third node N6 are in communications via cellular, and a second node U5 and a third node N6 are in communications via cellular. It is particularly underlined that the order illustrated in the embodiment does not put constraints over sequences of signal transmissions and implementations. Embodiments, sub-embodiments and subsidiary embodiments of embodiment 6 can be applied to embodiment 5 if no conflict is incurred, and vice versa, any of embodiments, sub-embodiments, and subsidiary embodiments of embodiment 5 can be applied to embodiment 6 if no conflict is incurred.

The first node U4 transmits a third information block in step S40; receives a first information block in step S41; and transmits a second information block in step S42.

The second node U5 transmits a fourth information block in step S50; and transmits a first information block in step S51.

The third node N6 receives a third information block in step S60; receives a fourth information block in step S61; and receives a second information block in step S62.

In Embodiment 6, the first information block is used to determine the first RE set; the second information block is used to indicate the first RE set; the third information block is used to indicate that computing power of the first node U4 is fully occupied; and the fourth information block is used to indicate that computing power of the second node U5 is not fully occupied.

In one embodiment, step S42 in Embodiment 6 takes before step S10 in Embodiment 5.

In one embodiment, step S51 in Embodiment 6 takes after step S20 in Embodiment 5.

In one embodiment, step S62 in Embodiment 6 takes before step S30 in Embodiment 5.

In one embodiment, the first information block is transmitted on sidelink.

In one embodiment, the second information block is transmitted on cellular link.

In one embodiment, a physical-layer channel occupied by the first information block comprises a Physical Sidelink Shared Channel (PSSCH).

In one embodiment, the first information block is transmitted through a MAC CE on sidelink.

In one embodiment, the second information block is transmitted through a MAC CE of cellular network.

In one embodiment, a physical-layer channel occupied by the second information block comprises a PUSCH.

In one embodiment, a physical-layer channel occupied by the second information block comprises a PUCCH.

In one embodiment, the second information block is transmitted through UCI.

In one embodiment, the first information block is used to indicate that computing power of the second node is not fully occupied.

In one embodiment, the first information block is used to indicate idle computing amount of the second node.

In one embodiment, the first information block is used to indicate that the second node supports shared idle CSI computing power.

In one embodiment, the first information block is used to indicate that the second node supports shared idle CSI reporting power.

In one embodiment, the first information block is used to indicate that the second node supports shared idle CSI process.

In one embodiment, the first information block is used to determine a number of RE(s) comprised in the first RE set requested by the first node.

In one embodiment, the first information block is used to determine a number of RS resource(s) corresponding to the first RE set requested by the first node.

In one embodiment, the second information block is used to indicate a number of RE(s) comprised in the first RE set requested by the first node.

In one embodiment, the second information block is used to indicate a number of RS resource(s) corresponding to the first RE set requested by the first node.

In one embodiment, the first information block is used to determine a number of RE(s) comprised in the second RE set.

In one embodiment, the first information block is used to determine a number of RS resource(s) corresponding to the second RE set.

In one embodiment, the third information block is transmitted through a MAC CE of cellular link.

In one embodiment, a physical-layer channel occupied by the third information block comprises a PUSCH.

In one embodiment, a physical-layer channel occupied by the third information block comprises a PUCCH.

In one embodiment, the third information block is transmitted through UCI.

In one embodiment, the fourth information block is transmitted through a MAC CE of cellular link.

In one embodiment, a physical-layer channel occupied by the fourth information block comprises a PUSCH.

In one embodiment, a physical-layer channel occupied by the fourth information block comprises a PUCCH.

In one embodiment, the fourth information block is transmitted through UCI.

In one embodiment, the second signal is transmitted through a MAC CE of cellular link.

In one embodiment, a physical-layer channel occupied by the second signal comprises a PUSCH.

In one embodiment, a physical-layer channel occupied by the second signal comprises a PUCCH.

In one embodiment, the second signal is transmitted through UCI.

In one embodiment, the third information block and the second information block are transmitted through a same physical-layer channel.

Embodiment 7

Figure 7:
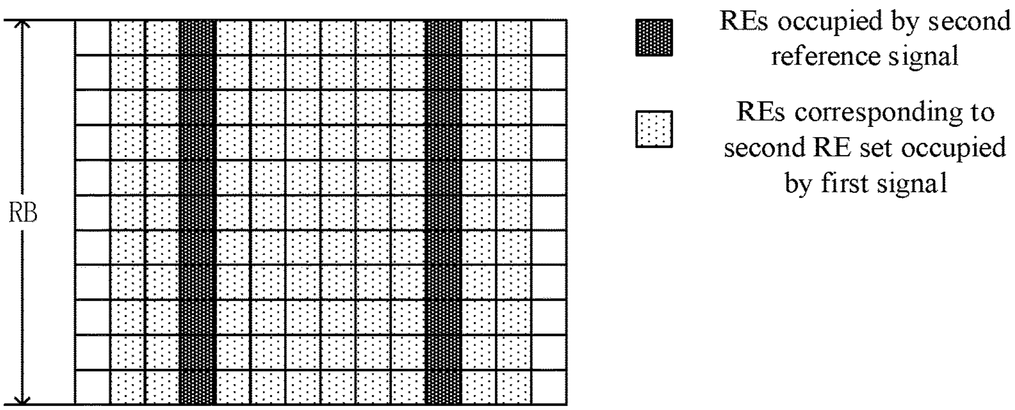
FIG. 7 illustrates a schematic diagram of a first signal and a second reference signal according to one embodiment of the present application.

Embodiment 7 illustrates a schematic diagram of a first signal and a second reference signal, as shown in FIG. 7. FIG. 7 illustrates a mapping mode of the first signal and the second reference signal in an RB in a slot; a small square in the figure represents an RE.

In one embodiment, the first signal and the second reference signal are transmitted with same transmit power.

In one embodiment, the second RE set occupied by the first signal is configured through an RRC signaling.

In one embodiment, the second RE set occupied by the first signal is indicated through Downlink Control Information (DCI).

In one embodiment, the second RE set occupied by the first signal is indicated through Sidelink Control Information (SCI).

In one embodiment, time-frequency resources occupied by the first reference signal is configured through an RRC signaling.

In one embodiment, the generation sequence of the first reference signal refers to the generation sequence of a DMRS in a PSCCH in TS 38.211.

In one embodiment, the generation sequence of the first reference signal refers to the generation sequence of a DMRS in a PSSCH in TS 38.211.

Embodiment 8

Figure 8:
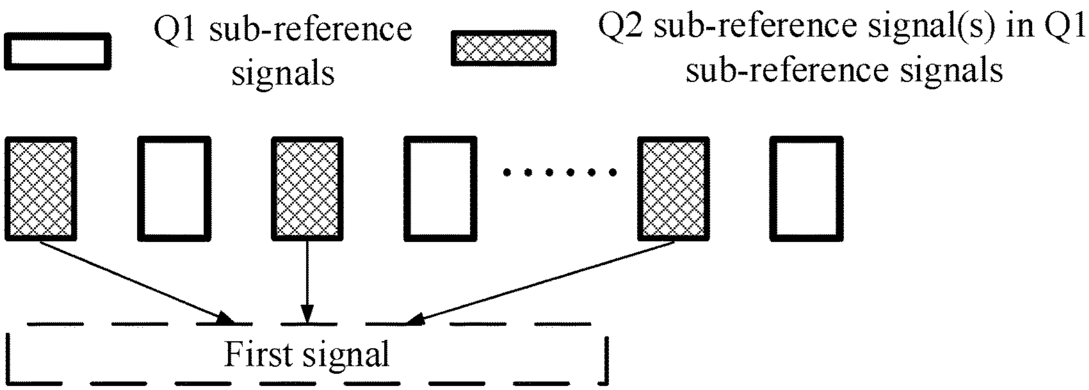
FIG. 8 illustrates a schematic diagram of a first reference signal and a first signal according to one embodiment of the present application.

Embodiment 8 illustrates a schematic diagram of a first reference signal and a first signal, as shown in FIG. 8. In FIG. 8, a first reference signal comprises Q1 sub-reference signals, Q1 being a positive integer greater than 1, and the Q1 sub-reference signals are respectively transmitted in Q1 RS resources; among the received Q1 RS resources, only Q2 sub-reference signal(s) received from Q2 RS resource(s)

is(are) used to generate the first signal, the Q2 RS resource(s) is(are) proper subset(s) of the Q1 RS resources, and the Q2 sub-reference signal(s) is(are) proper subset(s) of the Q1 sub-reference signals; the arrows shown in the figure indicate that partial received sub-reference signals are used to generate the first signal; the dotted line box in the figure represents the first signal.

Embodiment 9

Figure 9:
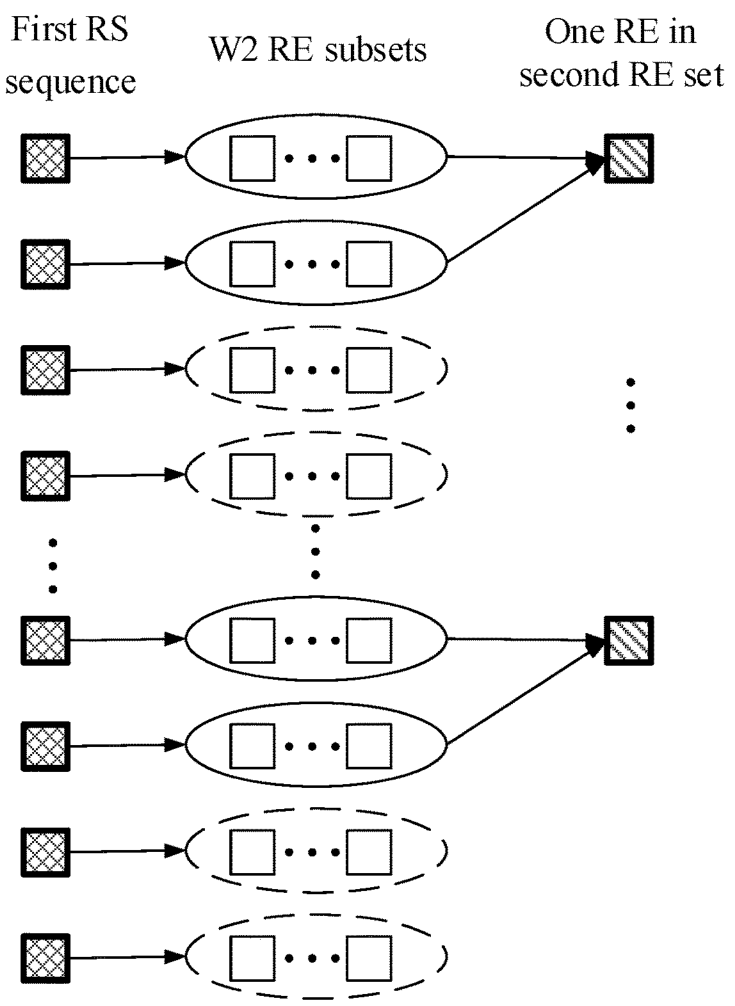
FIG. 9 illustrates a schematic diagram of a first RS sequence according to one embodiment of the present application.

Embodiment 9 illustrates a schematic diagram of a first RS sequence, as shown in FIG. 9. In FIG. 9, an element in a first RS sequence is mapped to W1 REs in the first RE set, W1 being a positive integer greater than 1. Each W1 REs in the first RE set is generated by an element in the first RS sequence; each W1 REs consists of an RE subset, and the first RE set comprises W2 RE subsets, W2 being a positive integer greater than 1; a first reference signal transmitted on only W3 RE subsets in the W2 RE subsets is used to generate the first signal, and there at least exist radio signals on two of the W3 RE subsets being mapped to one RE in the second RE set. The arrows shown in the figure represents generation, a small square represents an RE, the oval box in the figure represents an RE subset, and the oval in the figure represents W2 RE subsets; the solid ellipse represents an RE subset used to generate the first signal, i.e., W3 RE subsets; the dotted ellipse indicates that an RE subset not used to generate the first signal, i.e., an RE subset other than W3 RE subsets and in W2 RE subsets.

Embodiment 10

Figure 10:
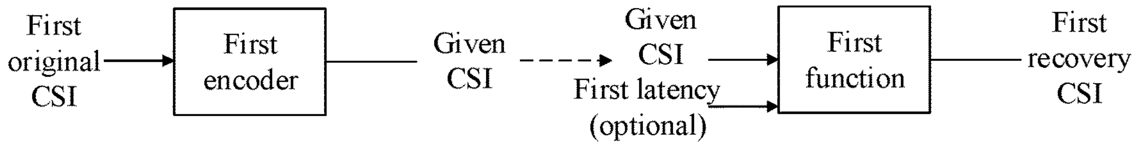
FIG. 10 illustrates a schematic diagram of given CSI according to one embodiment of the present application.

Embodiment 10 illustrates a schematic diagram of given CSI according to the present application, as shown in FIG. 10. In FIG. 10, an input of a first encoder comprises at least the first original CSI, the first original CSI is usually obtained after the first node or the second node experiences at least channel estimation; an input of the first encoder comprises the given CSI; the given CSI is reported to a receiver via an air interface; an input of a first function comprises at least the given CSI, and an output of the first function comprises the first recovery CSI.

In Embodiment 10, the first encoder is established at a first node or a second node, and the first function is established at the first node, the second node and a third node at the same time. The first encoder is used to compress the first original CSI to reduce radio overhead of the given CSI, the first function is used to decompress the given CSI to ensure that the first recovered CSI can accurately reflect actual channel characteristics as much as possible, therefore, the first function can also be called a decoder.

In one embodiment, the given CSI is the first CSI in the present application.

In one embodiment, the given CSI is the second CSI in the present application.

In one embodiment, at least partial parameters of the first function are trained on the first node side or the second node side, and are indicated by the first node to the third node through a higher-layer signaling, or are indicated by the second node to the third node through a higher-layer signaling.

In one embodiment, the first function is linear, such as wiener filtering, 2 times 1 dimension filter, and so on.

In one embodiment, both the first encoder and the first function are nonlinear.

In one embodiment, the first encoder box and the first function are realized based on a CRnet encoder and a CRnet decoder respectively, for detailed description, refer to Zhilin Lu, Multi-resolution CSI Feedback with Deep Learning in Massive MIMO System, 2020 IEEE International Conference on Communications (ICC).

In one embodiment, an optimization objective of the first function (without considering a first delay) comprises minimizing an error between the first recovery CSI and the first original CSI, such as a minimum Mean Square Error (MSE), a Linear Minimum Mean Square Error (LMMSE) and etc.

In the scenario where a channel changes slowly, the above method can simplify the design of the first function, thus reducing the complexity.

In one embodiment, an input of the first function comprises a first delay, and for the description of the first delay, refer to embodiment 8.

The advantage of introducing a first delay is that the first recovery CSI can more accurately reflect channel characteristics on scheduled time-frequency resources, while at the cost that the design of the first function may be more complicated (for example, an additional module for CSI prediction may be required).

Embodiment 11

Figure 11:
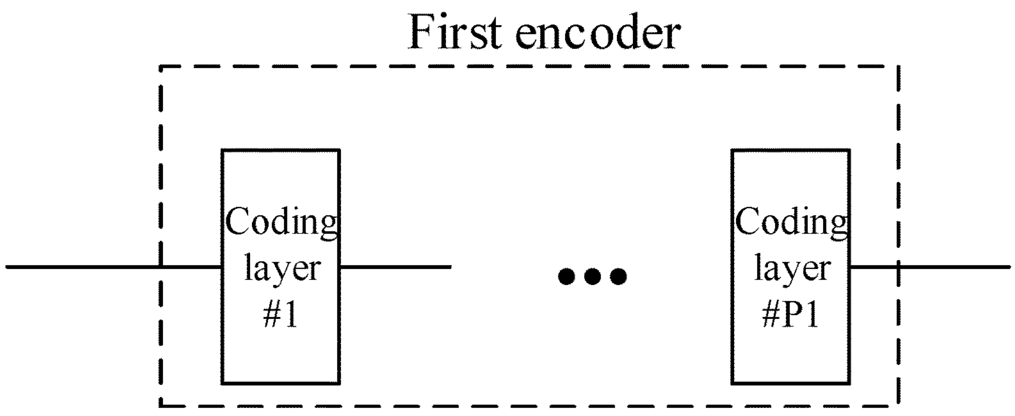
FIG. 11 illustrates a schematic diagram of a first encoder according to one embodiment of the present application.

Embodiment 11 illustrates a schematic diagram of a first encoder according to one embodiment of the present application, as shown in FIG. 11. In FIG. 11, the first encoder comprises P1 coding layers, namely coding layers #1, #2, . . . , #P1.

In one embodiment, P1 is 2, that is, the P1 coding layers comprise coding layer #1 and coding layer #2, and the coding layer #1 and coding layer #2 are convolution layer and fully connected layer respectively; in the convolution layer, at least one convolution kernel is used to convolve the first original CSI to generate a corresponding feature map, and at least one feature map output by the convolution layer is reshaped as a vector and input to the fully connected layer; the fully connected layer converts the vector into the first CSI. For more detailed description, refer to CNN-related technical literature, such as Chao Kai Wen, Deep Learning for Massive MIMO CSI Feedback, IEEE WIRELESS COMMUNICATIONS LETTERS, VOL 7, NO. 5, OCTOBER 2018 and etc.

In one embodiment, P1 is 3, that is, the P1 coding layers comprise a fully connected layer, a convolution layer and a pooling layer.

Embodiment 12

Figure 12:
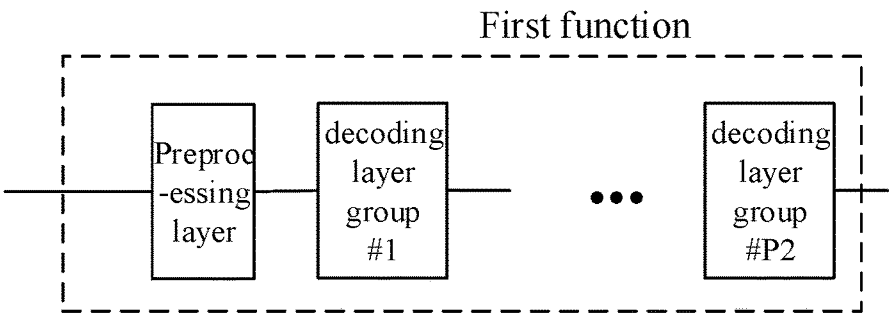
FIG. 12 illustrates a schematic diagram of a first function according to one embodiment of the present application.

Embodiment 12 illustrates a schematic diagram of a first function according to one embodiment of the present application, as shown in FIG. 12. In FIG. 12, the first function comprises a preprocessing layer and P2 decoding layer groups, namely decoding layer groups #1, #2, . . . , #P2, and each decoding layer group comprises at least one decoding layer.

According to the traditional CSI processing algorithm, the first CSI can be considered as the result of quantizing a sampling of the first original CSI in time domain or frequency domain; accordingly, the first function is linear, for example, the first CSI is interpolated and filtered in time domain or frequency domain to obtain the first recovery CSI.

Except that the first function described above is a linear function, the following embodiments describe embodiments of nonlinear functions.

In one embodiment, the preprocessing layer is a fully connected layer, which expands a size of the first CSI to a size of the first original CSI.

In one embodiment, structures of any two of the P2 decoding layer groups are the same, and the structure comprises a number of comprised decoding layers, a size of an input parameter and a size of an output parameter of each comprised decoding layer and etc.

In one embodiment, the second node indicates the structure of P2 and the decoding layer group to the first node, and the first node indicates other parameters of the first function through the second signaling.

In one embodiment, the other parameters comprise at least one of a threshold of an activation function, a size of the convolution kernel, a step-size of the convolution kernel, and a weight between feature maps.

Embodiment 13

Figure 13:
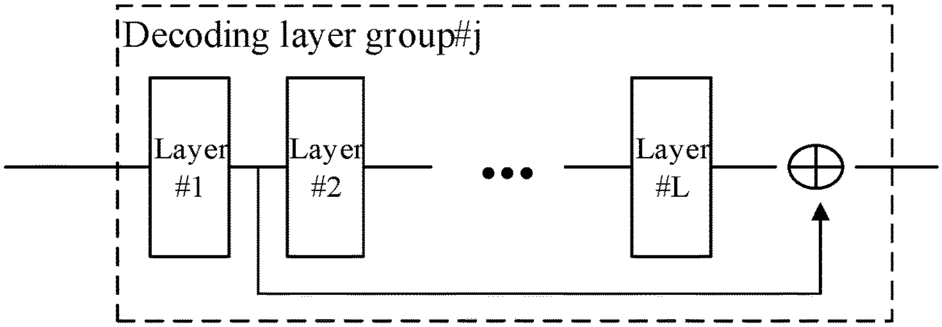
FIG. 13 illustrates a schematic diagram of a decoding layer group according to one embodiment of the present application.

Embodiment 13 illustrates a schematic diagram of a decoding layer group according to one embodiment of the present application, as shown in FIG. 13. In FIG. 13, the decoding layer group #j comprises L layers, that is, layers #1, #2, . . . , #L; the decoding layer group is any of the P2 decoding layer groups.

In one embodiment, L is 4, a first layer of the L layers is an input layer, and last three layers of the L layers are convolution layers, for more detailed description, refer to CNN-related technical literature, such as Chao Kai Wen, Deep Learning for Massive MIMO CSI Feedback, IEEE WIRELESS COMMUNICATIONS LETTERS, VOL 7, NO. 5, OCTOBER 2018 and etc.

In one embodiment, the L layers comprise at least one convolution layer and one pooling layer.

Embodiment 14

Figure 14:
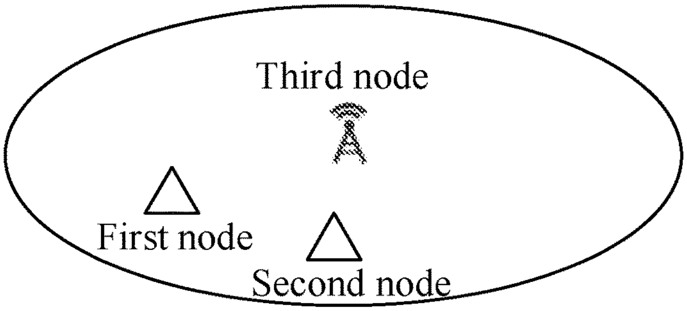
FIG. 14 illustrates a schematic diagram of an application scenario according to one embodiment of the present application.

Embodiment 14 illustrates a schematic diagram of an application scenario, as shown in FIG. 14. In FIG. 14, both the first node and the second node shown in the figure are served by the third node, and the first node and the second node can be in V2X communications. When the first node performs AI-related CSI calculation and reporting, and when the computing power of the first node is fully occupied, if the computing power of the second node is not fully occupied, the second node can help the first node perform CSI calculation based on AI, and feed back the calculation result to the third node.

Embodiment 15

Figure 15:
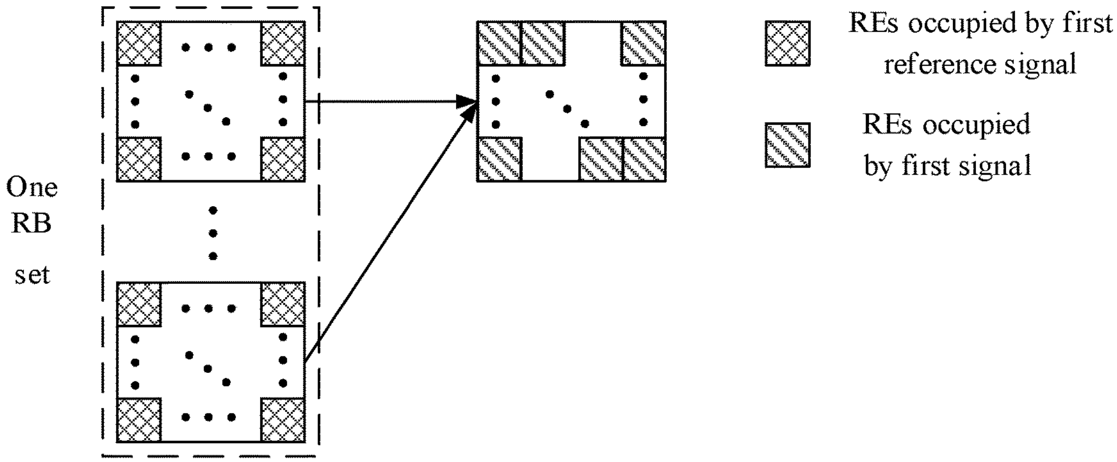
FIG. 15 illustrates a schematic diagram of mapping of a first signal according to one embodiment of the present application.

Embodiment 15 illustrates a schematic diagram of mapping of a first signal, as shown in FIG. 15. In FIG. 15, a first reference signal occupies X1 RB sets in frequency domain, and any of the X1 RB sets occupies X2 RBs, both X1 and X2 being positive integers greater than 1; the first signal occupies X1 RBs in frequency domain; the rectangle shown in the figure represents an RB, and the dotted rectangle represents an RB set.

In one embodiment, partial REs occupied by the first reference signal in each of the X1 RB sets are mapped to a corresponding RB in the X1 RBs.

In one embodiment, each RE occupied by the first reference signal in each RB set of the X1 RBs is mapped to a corresponding RB in the X1 RBs.

In one embodiment, the RB described here occupies 12 continuous subcarriers in frequency domain and one slot in time domain.

In one embodiment, a number of REs occupied by the first reference signal in each of the X1 RB sets is the same.

In one embodiment, a number of REs occupied by the first reference signal in each of the X1 RB sets is not greater than a number of all REs comprised in one RB.

In one embodiment, a number of REs occupied by the first reference signal in one RB is less than a number of REs occupied by the first signal in one RB.

Embodiment 16

Figure 16:
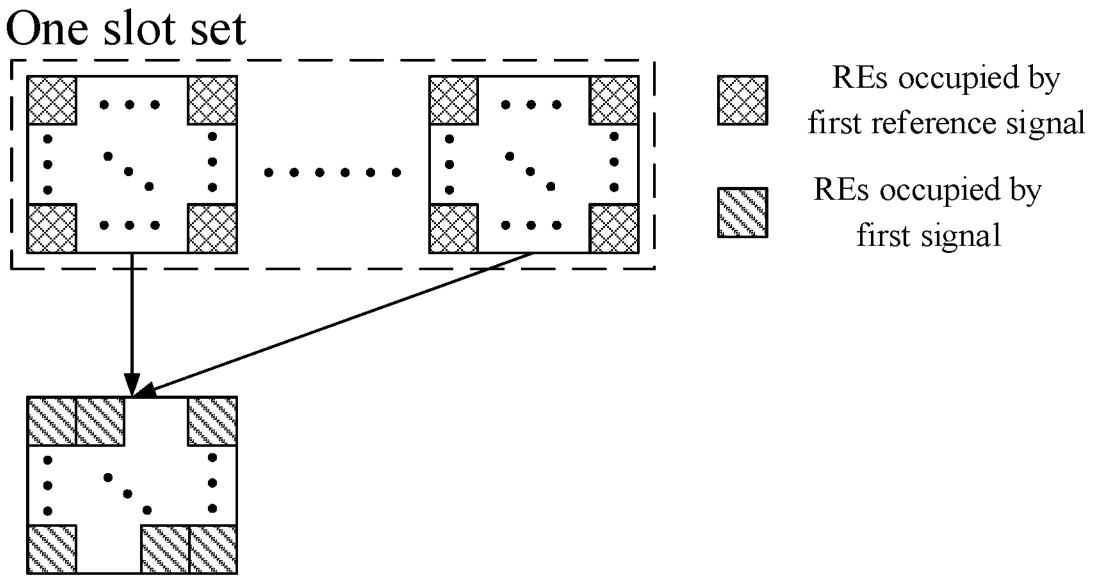
FIG. 16 illustrates a schematic diagram of mapping of a first signal according to another embodiment of the present application.

Embodiment 16 illustrates another schematic diagram of mapping of a first signal, as shown in FIG. 16. In FIG. 16, a first reference signal occupies Y1 slot sets in time domain, and any of the Y1 slot sets occupies Y2 slots, both Y1 and Y2 being positive integers greater than 1; the first signal occupies Y1 slots in frequency domain. The rectangle shown in the figure represents a slot, and the dotted box represents a slot set.

In one embodiment, partial REs occupied by the first reference signal in each slot set of Y1 slot sets are mapped to a corresponding slot in Y1 slots.

In one embodiment, each RE occupied by the first reference signal in each of Y1 slot sets is mapped to a corresponding slot in Y1 slots.

In one embodiment, the RB described here occupies 12 continuous subcarriers in frequency domain and one slot in time domain.

In one embodiment, a number of REs occupied by the first reference signal in each of the Y1 slot sets is the same.

In one embodiment, a number of REs occupied by the first reference signal in an RB in each of the Y1 slot sets is not greater than a number of all REs comprised in a slot in an RB.

In one embodiment, a number of REs occupied by the first reference signal in a slot is less than a number of REs occupied by the first signal in a slot.

Embodiment 17

Figure 17:
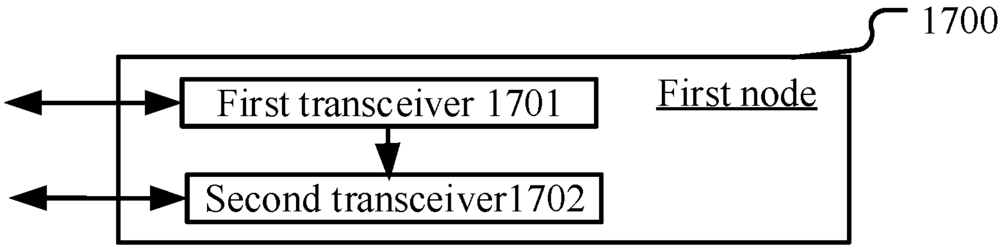
FIG. 17 illustrates a structure block diagram of a processor in a first node according to one embodiment of the present application.

Embodiment 17 illustrates a structure block diagram in a first node, as shown in FIG. 17. In FIG. 17, a first node 1700 comprises a first transceiver 1701 and a second transceiver 1702.

The first transceiver 1701 receives a first reference signal in a first RE set, the first RE set comprises multiple REs, an RS sequence of the first reference signal is a first RS sequence;

the second transceiver 1702 transmits a first signal and a second reference signal, the first signal occupies a second RE set, the second RE set comprises multiple REs;

in Embodiment 17, the received first reference signal is used to generate the first signal, and each element in at least partial elements in the first RS sequence is mapped to a part of the first signal in at least one RE; small-scale fading experienced by the second reference signal is used to determine small-scale fading experienced by the first signal.

In one embodiment, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

In one embodiment, each element of the at least partial elements in the first RS sequence is mapped to multiple REs in the first RE set, and each element of the at least partial elements in the first RS sequence is only mapped to one RE in the second RE set.

In one embodiment, the at least partial elements in the first RS sequence are mapped into the second RE set in order according to a first criterion; the first criterion comprises frequency domain first and then time domain, or, the first criterion comprises time domain first and then frequency domain.

In one embodiment, the first transceiver 1701 receives a first signaling, the first signaling is used to indicate the first RE set.

In one embodiment, the second transceiver 1702 receives first CSI; the first signal is used to generate the first CSI.

In one embodiment, the first transceiver 1701 receives a first information block, and the first transceiver transmits a second information block; a receiver of the first signal comprises a second node, and the second node transmits the first information block; the first information block is used to determine the first RE set; the second information block is used to indicate the first RE set; a transmitter of the first reference signal receives the second information block.

In one embodiment, the first transceiver 1701 transmits a third information block; the third information block is used to indicate that computing power of the first node is fully occupied.

In one embodiment, the first transceiver 1701 comprises at least first six of the antenna 452, the receiver/transmitter 454, the multi-antenna receiving processor 458, the multi-antenna transmitting processor 457, the receiving processor 456, the transmitting processor 468, and the controller/processor 459 in Embodiment 4.

In one embodiment, the first transceiver 1702 comprises at least first six of the antenna 452, the receiver/transmitter 454, the multi-antenna receiving processor 458, the multi-antenna transmitting processor 457, the receiving processor 456, the transmitting processor 468, and the controller/processor 459 in Embodiment 4.

Embodiment 18

Figure 18:
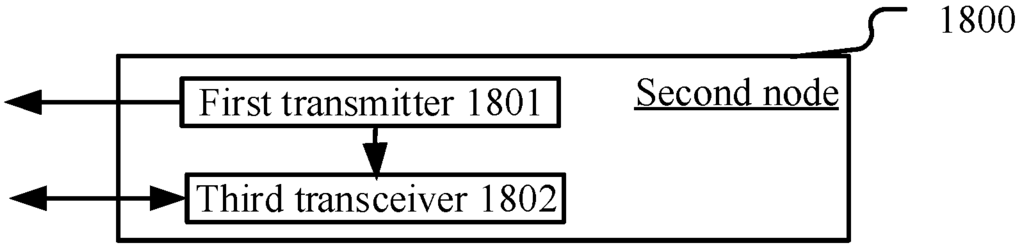
FIG. 18 illustrates a structure block diagram of a processor in a second node according to one embodiment of the present application.

Embodiment 18 illustrates a structure block diagram of in a second node, as shown in FIG. 18. In FIG. 18, a second node 1800 comprises a first transmitter 1801 and a third transceiver 1802.

The first transmitter 1801 transmits a first information block;

the third transceiver 1802 receives a first signal and a second reference signal, the first signal occupies a second RE set, the second RE set comprises multiple REs;

in Embodiment 18, a transmitter of the first signal comprises a first node, the first node receives a first reference signal in a first RE set, the first RE set comprises multiple REs, and an RS sequence of the first reference signal is a first RS sequence; the first reference signal received by the first node is used to generate the first signal, and each element in at least partial elements in the first RS sequence is mapped to a part of the first signal in at least one RE; small-scale fading experienced by the second reference signal is used to determine small-scale fading experienced by the first signal; the first information block is used to determine the first RE set.

In one embodiment, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

In one embodiment, each element of the at least partial elements in the first RS sequence is mapped to multiple REs in the first RE set, and each element of the at least partial elements in the first RS sequence is only mapped to one RE in the second RE set.

In one embodiment, the at least partial elements in the first RS sequence are mapped into the second RE set in order according to a first criterion; the first criterion comprises frequency domain first and then time domain, or, the first criterion comprises time domain first and then frequency domain.

In one embodiment, the third transceiver 1802 transmits a first CSI; the first signal is used to generate the first CSI.

In one embodiment, the first transmitter 1801 transmits a fourth information block; the fourth information block is used to indicate that computing power of the second node is not fully occupied.

In one embodiment, the first transmitter 1801 transmits a second signal, and the second signal comprises a second CSI; the first signal and the second reference signal are used together to determine the second CSI, and the second CSI is for channel quality of a radio signal between a transmitter of the first reference signal and the first node.

In one embodiment, the first transmitter 1801 comprises at least the first four of the antenna 452, the transmitter 454, the multi-antenna transmitting processor 457, the transmitting processor 468 and the controller/processor 459 in Embodiment 4.

In one embodiment, the third transceiver 1802 comprises at least first six of the antenna 452, the receiver/transmitter 454, the multi-antenna receiving processor 458, the multi-antenna transmitting processor 457, the receiving processor 456, the transmitting processor 468, and the controller/processor 459 in Embodiment 4.

Embodiment 19

Figure 19:
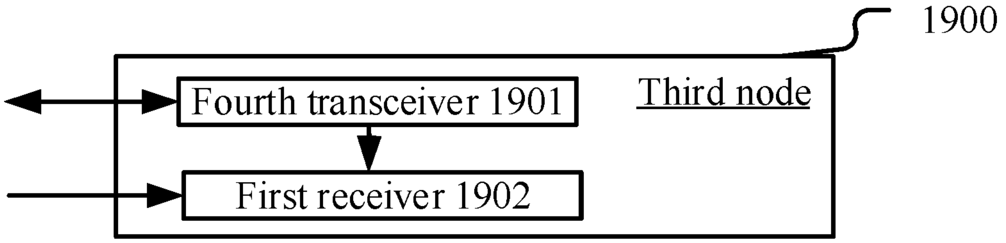
FIG. 19 illustrates a structure block diagram of a processor in a third node according to one embodiment of the present application.

Embodiment 19 illustrates a structure block diagram of a third node, as shown in FIG. 19. In FIG. 19, a third node 1900 comprises a fourth transceiver 1901 and a first receiver 1902.

The fourth transceiver 1901 transmits a first reference signal in a first RE set, the first RE set comprises multiple REs, and an RS sequence of the first reference signal is a first RS sequence;

the first receiver 1902 receives a second signal;

in Embodiment 19, a receiver of the first reference signal comprises a first node, the first node transmits a first signal and a second reference signal, the first signal occupies a second RE set, and the second RE set comprises multiple REs; the received first reference signal is used to generate the first signal, and each element in at least partial elements in the first RS sequence is mapped to a part of the first signal in at least one RE; small-scale fading experienced by the second reference signal is used to determine small-scale fading experienced by the first signal; the second signal comprises a second CSI; the first signal and the second reference signal are used together to determine the second CSI, and the second CSI is for channel quality of a radio signal between the third node and the first node.

In one embodiment, the first reference signal comprises Q1 sub-reference signals, Q1 being a positive integer greater than 1, and the Q1 sub-reference signals are respectively transmitted in Q1 RS resources; the part of the first reference signal received only in Q2 RS resource(s) is used to generate the first signal, and the Q2 RS resource(s) is(are) proper subset(s) of the Q1 RS resources.

In one embodiment, each element of the at least partial elements in the first RS sequence is mapped to multiple REs in the first RE set, and each element of the at least partial elements in the first RS sequence is only mapped to one RE in the second RE set.

In one embodiment, the at least partial elements in the first RS sequence are mapped into the second RE set in order according to a first criterion; the first criterion comprises frequency domain first and then time domain, or, the first criterion comprises time domain first and then frequency domain.

In one embodiment, the fourth transceiver 1901 transmits a first signaling, the first signaling is used to indicate the first RE set.

In one embodiment, the fourth transceiver 901 receives a second information block; a receiver of the first signal comprises a second node, and the second node transmits a first information block; the first information block is used to determine the first RE set; the second information block is used to indicate the first RE set; the first node transmits the second information block.

In one embodiment, the fourth transceiver 901 receives a third information block; the third information block is used to indicate that computing power of the first node is fully occupied.

In one embodiment, the fourth transceiver 1901 comprises at least first six of the antenna 420, the transmitter/receiver 418, the multi-antenna transmitting processor 471, the multi-antenna receiving processor 472, the transmitting processor 416, the receiving processor 470, and the controller/processor 475 in Embodiment 4.

In one embodiment, the first receiver 1902 comprises at least first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The second node in the present application includes but is not limited to macro-cellular base stations, femtocell, micro-cellular base stations, home base stations, relay base station, eNB, gNB, Transmitter Receiver Point (TRP), GNSS, relay satellites, satellite base stations, space base stations, RSUs, Unmanned Aerial Vehicle (UAV), test devices, for example, a transceiver or a signaling tester simulating some functions of a base station and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a transceiver; and a processor, wherein the transceiver and the processor are configured to:

receive a first Reference Signal (RS) in a first Resource Element (RE) set, wherein the first RS is associated with a first RS sequence, generate a first signal based on the first RS, and transmit the first signal and a second RS, wherein the first signal is transmitted in a second RE set, and wherein at least one element in the first RS sequence is mapped to at least one RE in the second RE set, and wherein the processor is configured to determine, based on small-scale fading experienced by the second RS, small-scale fading experienced by the first signal.

2. The UE according to claim 1, wherein the first RS comprises a first set of sub-reference signals and wherein the first set of sub-reference signals are respectively transmitted in a first set of RS resources, and wherein a part of the first RS received only in a second set of RS resources is configured to generate the first signal, and wherein the second set of RS resources is a proper subset of the first set of RS resources.

3. The UE according to claim 1, wherein at least one element in the first RS sequence is mapped to multiple REs in the first RE set, and wherein at least one element in the first RS sequence is only mapped to one RE in the second RE set.

4. The UE according to claim 1, wherein at least one element in the first RS sequence is mapped into the second RE set in order according to a first criterion, and wherein the first criterion comprises frequency domain first and then time domain, or, the first criterion comprises time domain first and then frequency domain.

5. The UE according to claim 1, wherein the transceiver and the processor are further configured to:

receive a first signaling indicative of the first RE set.

6. The UE according to claim 1, wherein the transceiver and the processor are further configured to:

receive first Channel State information (CSI), wherein the first signal is configured to generate the first CSI.

7. The UE according to claim 1, wherein the transceiver and the processor are further configured to:

receive a first information block, transmit a second information block indicative of the first RE set, wherein a receiver of the first signal comprises a node, and the node transmits the first information block, determine, based on the first information block, the first RE set, wherein a transmitter of the first RS receives the second information block.

8. The UE according to claim 1, wherein the transceiver and the processor are further configured to:

transmit a third information block indicating that computing power of the UE is fully occupied.

9. A user equipment (UE) for wireless communications, the UE comprising:

a transceiver; and a processor, wherein the transceiver and the processor are configured to:

receive a first signal and a second reference signal (RS), wherein the first signal occupies a second Resource Element (RE) set;

wherein a transmitter of the first signal comprises a node that receives a first RS in a first RE set, and wherein an RS sequence of the first RS is a first RS sequence, and wherein the first RS received by the node is configured to generate the first signal, and wherein at least one element in the first RS sequence is mapped to at least one RE in the second RE set, and wherein small-scale fading experienced by the second RS is configured to determine small-scale fading experienced by the first signal.

10. The UE according to claim 9, wherein the first RS comprises a first set of sub-reference signals, and wherein the first set of sub-reference signals are respectively transmitted in a first set of RS resources, and wherein a part of the first RS received only in a second set of RS resources is configured to generate the first signal, and wherein the second set of RS resources is a proper subset of the first set of RS resources.

11. The UE according to claim 9, wherein at least one element in the first RS sequence is mapped to multiple REs in the first RE set, and wherein at least one element in the first RS sequence is only mapped to one RE in the second RE set.

12. The UE according to claim 9, wherein at least one element in the first RS sequence is mapped to the second RE set in order according to a first criterion, and wherein the first criterion comprises frequency domain first and then time domain, or, the first criterion comprises time domain first and then frequency domain.

13. The UE according to claim 9, wherein the transceiver and the processor are further configured to:

transmit a first CSI, wherein the first signal is configured to generate the first CSI.

14. The UE according to claim 9, wherein the transceiver and the processor are further configured to:

transmit a first information block, wherein the node receives the first information block, and wherein the first information block is configured to determine the first RE set.

15. The UE according to claim 14, wherein the transceiver and the processor are further configured to:

transmit a fourth information block, wherein the fourth information block is configured to indicate that computing power of the node is not fully occupied.

16. The UE according to claim 14, wherein the transceiver and the processor are further configured to:

transmit a second signal, comprising a second CSI, wherein the first signal and the second RS are configured together to determine the second CSI, and wherein the second CSI is for channel quality of a radio signal between a transmitter of the first RS and the node.

17. A method in a user equipment (UE) for wireless communications, the method comprising:

receiving a first Reference Signal (RS) in a first Resource Element (RE) set, wherein the first RS is associated with a first RS sequence;

generating a first signal based on the first RS; and transmitting the first signal and a second RS, wherein the first signal is transmitted in a second RE set, and wherein at least one element in the first RS sequence is mapped to at least one RE in the second RE set, and wherein small-scale fading experienced by the second reference signal is configured to determine small-scale fading experienced by the first signal.

18. The method according to claim 17, wherein the first RS comprises a first set of sub-reference signals, and wherein the first set of sub-reference signals are respectively transmitted in a first set of RS resources, and wherein a part of the first RS received only in a second set of RS resources is configured to generate the first signal, and wherein the second set of RS resources is a proper subset of the first set of RS resources.

19. The method according to claim 17, wherein at least one element in the first RS sequence is mapped to multiple REs in the first RE set, and wherein at least one element in the first RS sequence is only mapped to one RE in the second RE set.

20. The method according to claim 17, wherein at least one element in the first RS sequence is mapped into the second RE set in order according to a first criterion, and wherein the first criterion comprises frequency domain first and then time domain, or, the first criterion comprises time domain first and then frequency domain.

* * * * *